May 27, 1958
R. ROSEBROOK
2,836,387
TRACER MECHANISM
Filed Nov. 14, 1955
2 Sheets-Sheet 1
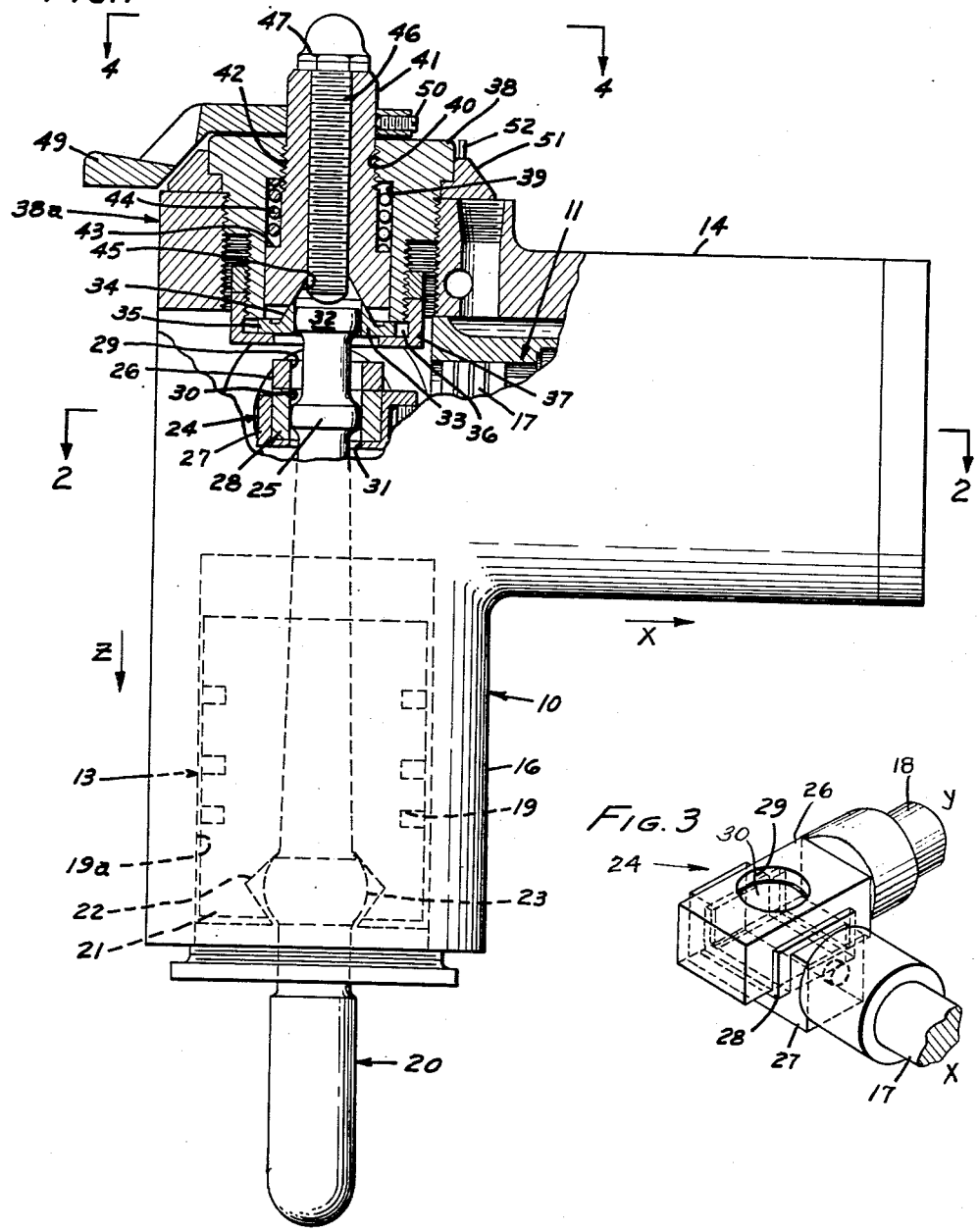
INVENTOR.
ROY ROSEBROOK
BY
D. Gordon Angus
ATTORNEY.

May 27, 1958 R. ROSEBROOK 2,836,387
TRACER MECHANISM
Filed Nov. 14, 1955 2 Sheets-Sheet 2
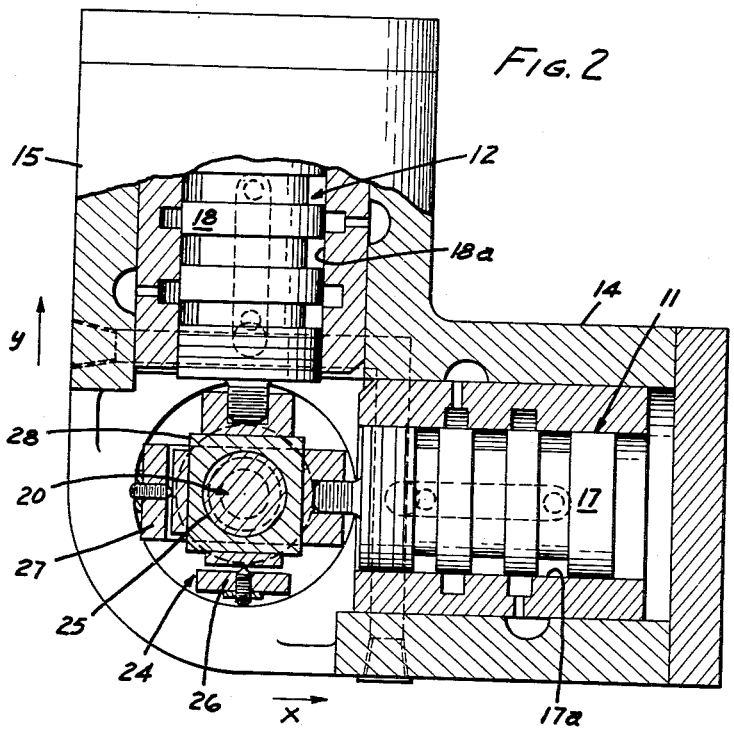
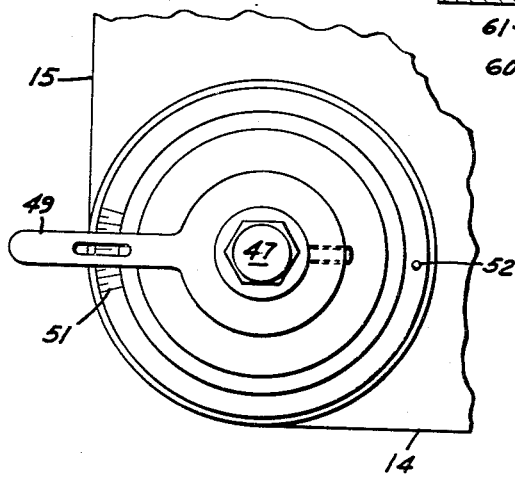
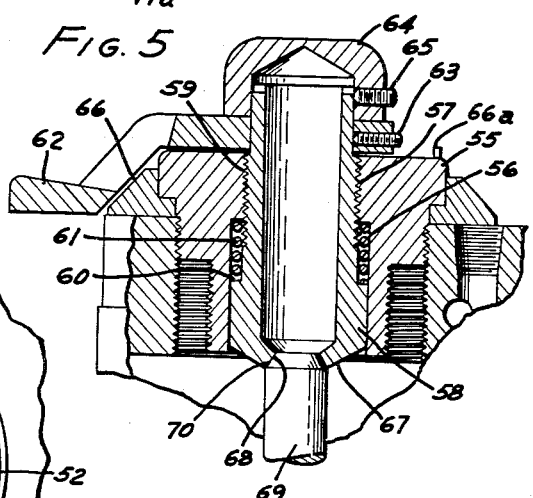
INVENTOR.
ROY ROSEBROOK
BY
D. Gordon Angus
ATTORNEY.

United States Patent Office 2,836,387
Patented May 27, 1958

2,836,387

TRACER MECHANISM

Roy Rosebrook, Montebello, Calif., assignor to True-Trace Corporation, El Monte, Calif., a corporation of California Application November 14, 1955, Serial No. 546,327

4 Claims. (Cl. 251—3)

This invention relates to tracer mechanism for use in controlling the operation of contour-duplicating machine tools.

In order to reproduce complex surfaces, a milling machine, or other machine having a cutting tool, is frequently controlled by means of a tracer mechanism which moves over the surface of a master template and causes the cutting tool to take a similar path with respect to the work piece so as to reproduce the shape of the template. The bed of the machine tool is often made movable in either two or three dimensions relative to the cutting tool in response to actuation of motors such as hydraulic piston and cylinder assemblies. It is the purpose of the tracer mechanism to control these motors so that the work piece and cutting tool move relative to each other and reproduce the contour of the master template in the work piece.

A well known type of tracer mechanism utilizes a pivoted stylus which contacts the work piece. Movement of the stylus from a rest position changes valve settings in the tracer mechanism, which causes one or more of the motors to move the bed and cutting tool relative to each other so as to return the stylus to a rest or null position. During this movement, the cutting tool cuts the desired surface. The rate of feed of the work piece in relation to the cutting tool is critical in installations of this type. An unnecessarily slow rate of feed wastes expensive machine time, while too high a rate of feed causes breakage of cutting tools and spoiled work.

Feed rate control mechanism presently exist which give satisfactory control, and two such mechanisms are shown in my co-pending applications Serial No. 302,431, filed August 2, 1952 for a tracer mechanism now U. S. Patent No. 2,753,145, and Serial No. 384,274, filed October 5, 1953 for a tracer mechanism. The former application relates to a tracer mechanism for two-dimensional reproduction, while the latter relates to a tracer mechanism for three-dimensional reproduction.

For very precise work, it has been found that an even more delicate and more closely adjustable feed rate control is desirable than is provided in the aforesaid co-pending applications. Therefore, an object of this invention is to provide a feed rate control mechanism which can regulate a tracer mechanism to limit the maximum feed rate to a delicately adjustable and predetermined value.

This invention is carried out in combination with a tracer mechanism with a stylus which is pivotally mounted to swing around any horizontal axis, so as to move and change the settings of mutually perpendicular valves. These valves are adapted to control the operation of motors, which may conveniently be hydraulic motors, pistons and cylinders, for example. These motors in turn determine the relative position of the cutting tool and the work piece, and their speed of movement determines the feed rate to the cutting tool.

If desired, a third valve may be provided which is mutually perpendicular to said first mentioned valves to provide for three-dimensional tracing by said mechanism. The extent of movement of the first mentioned valves is determined by the amount by which the stylus is pivoted, and of the third, by the amount by which the stylus is lifted. By controlling the maximum tilt and lift of the stylus, a maximum speed of movement of the motors, and thus of feed rate to the cutting tool is determined.

A feature of this invention resides in a rotatable rate adjustent screw threadedly mounted to the tracer mechanism housing so as to be substantially collinear with the stylus. This screw is so disposed and arranged that turning the same will cause it to move axially toward or away from the stylus. The stylus and the rate adjustment screw are provided with non-planar surfaces which meet when the stylus is tilted relative to the central axis of the rate adjustment screw, the maximum amount of tilt and lift allowed being determined by the spacing of the surfaces from each other.

According to a preferred but optional feature of this invention, a backlash-eliminating spring is disposed between the housing of the tracer mechanism and the rate adjustment screw so as to maintain the said rate adjustment screw firmly against the threads in the housing, to eliminate looseness in the adjustment.

A further optional feature resides in providing a set screw which extends into the rate adjustment screw to meet the end of the stylus when the stylus is moved toward the rate adjustment screw, so as to provide an adjustable rate control for a third dimension. A tracer mechanism so equipped provides three dimensional rate control.

The above and other features of this invention will be fully understood from the following detailed description and the accompanying drawings, in which:

Fig. 1 is a side elevation, partly in cross-section of a tracer mechanism according to this invention which is adaptable for rate control of a cutting tool in three dimensions;

Fig. 2 is a view partly in cross-section, taken generally at line 2—2 of Fig. 1;

Fig. 3 is a fragmentary view in perspective of a portion of the apparatus of Fig. 1;

Fig. 4 is a fragmentary top view of Fig. 1 taken at line 4—4 thereof; and

Fig. 5 is a side view, partly in cross-section, of a device according to this invention which is suitable for controlling movements of machine tools in two dimensions.

In Fig. 1 there is shown a hydraulic tracer mechanism for controlling the position of a cutting tool with respect to a work piece. A common application of this device is in the control of a three dimensional milling device wherein the work table may be shifted in two horizontal directions, and also raised and lowered relative to the cutting tool. The movement of a work table of this nature is generally controlled by a motor of some sort, a common example being a hydraulic piston and cylinder assembly. It is the purpose of the tracer mechanism of Fig. 1 to provide means for controlling the operation of said motors in response to a movement of a stylus. The stylus contacts a pattern or template, and valve setting changes caused by contact with the template surfaces admit pressurized fluid to the motors, so as to cause the work piece and cutting tool to be moved relative to each other to reproduce the pattern or template shape in the work piece. A detailed showing of a machine tool system incorporating a valve of this type may be found in my co-pending application, Serial No. 302,431 filed August 2, 1952 for a tracer mechanism, now U. S. Patent No. 2,753,145.

For this purpose the tracer mechanism 10 may be connected to the machine tool (not shown). The tracer mechanism 10 is provided with three spool valves: an X axis valve 11, a Y axis valve 12 and a Z axis valve 13.

These valves are disposed in arms 14, 15, and 16 respectively and are mutually perpendicular to each other. An X axis spool 17, Y axis spool 18, and a Z axis spool 19 are fitted respectively within cylinders 17a, 18a and 19a. Said spools and said cylinders are provided with matching grooves so that passage of fluid under pressure through the spool valves is determined by the shifting of the valve spools within the cylinder. For a more complete discussion of the hydraulic passages through said tracer mechanism, reference may be had to the above-identified co-pending patent applications, said hydraulic passages being of no importance to the present invention.

A stylus 20 is supported in the Z axis spool by means of a retainer 21 and a socket 22. The retainer and socket hold a ball-like member 23 of the stylus so that the stylus can rotate around any horizontal axis of the ball-like member but will not move up and down in the socket. It will be observed that the Z axis spool 19 can be moved up and down by lifting or lowering the stylus, but that the stylus will not move up and down independently of the Z axis spool.

An attachment device 24, which is shown in full particulars in Fig. 3, serves to attach X axis spool 17 and Y axis spool 18 to the stylus. A second ball-like member 25 is incorporated into the stylus at this location, and is spaced from the first ball-like member 23.

This attachment device has a first U-shaped member 26 attached to the Y axis cylinder and a second U-shaped member 27 attached to the X axis valve spool. These U-shaped members are inverted with respect to each other with their bights crossed so as to enclose a block 28 therebetween. The sides of this block are slidedly related to the insides of the legs and the bights of the U-shaped members. The U-shaped members and the block 28 have holes 29, 30, and 31 therethrough to pass the stylus, and the second ball-like member 25 fits snugly and rotatably in the hole 30 in the block.

At the upper end of the stylus there is provided a third ball-like member 32 which fits snugly within a body 33. This body is provided with a nonplanar surface 34 at the upper outer surface thereof. As shown, this surface is preferably a frusto-conical surface of revolution in shape, and may conveniently have a conical angle of approximately 60°. The body has a sidewardly directed flange which fits within a channel 36 formed by a retainer 37 and a rate control housing 38. It will be seen that this body 33 is essentially an extension of the stylus in that, while the stylus can move vertically within said body without causing a change of position of the body, any non-vertical movement of the stylus will cause a corresponding sideward movement of the body 33.

The rate control housing 38 is threaded into the housing 38a of the tracer mechanism so as to form a continuation thereof, and is provided with an internal counterbore 39, and a threaded passage 40. A rate adjustment screw 41 is provided with external threads 42, which engage in the threaded passage 40, and a shoulder 43 which fits within the counterbore 39. A backlash-eliminating spring 44 is placed between the shoulder 43 and the rate control housing (that is, the housing of the tracer mechanism) to eliminate backlash between the threads 42 and the threaded passage 40.

The rate adjustment screw is provided with a non-planar surface 45 which preferably matches and mates with the surface 34 on the body 33. A vertical adjustment screw 46 is threaded into the rate adjustment screw, and projects downward toward the top of the stylus. An acorn nut 47 may be tightened on the rate adjustment screw 46 to maintain the setting of the same.

A rate control lever 49 is attached to the rate adjustment screw 41 by means of a set screw 50 so that turning the lever 49 will turn the rate adjustment screw to raise and lower the same relative to the stylus. A graduation ring 51 is placed around the rate control housing 38 and may be calibrated so that the position of the rate control lever indicates the spacing of the non-planar surfaces 34 and 45 from each other. Stop 52 on the gradulation ring projects into the path of lever 49 to restrict its maximum movement.

In Fig. 5 there is shown a rate control device which is adequate for control of a machine tool operating in two dimensions instead of three, and which may be directly substituted for the rate control device of Fig. 1 by unscrewing the rate control housing 38 therefrom and replacing the same with the rate control housing of this embodiment.

In the embodiment of Fig. 5, a rate control housing 55 is threaded into the housing of the tracer mechanism. The housing 55 has a counterbore 56 therein and a reduced-diameter threaded passage 57. A rate control screw 58 has external threads 59 which are engaged in the threaded passage 57 and is provided with a shoulder 60. A backlash-eliminating spring 61 is placed between the shoulder 60 and the rate control housing 55 so as to eliminate backlash in the threads.

A rate control lever 62 is attached to the rate control screw 58 by means of a set screw 63, and a cap 64 is also attached atop said rate adjustment screw by means of a set screw 65. A graduation ring 66 surrounds the rate control screw and may bear graduations to indicate the separation of the rate adjustment screw and the stylus. Stop 66a projects into the path of lever 62 to restrict its maximum movement.

The rate control screw may conveniently be substantially hollow, and have a sloped shoulder 67 at its lower end. The shoulder is provided with a non-planar surface 68 which is conveniently a frusto-conical surface of revolution. The stylus 69 will have a non-planar surface 70 which preferably matches the surface 68. This surface 70 will be on the end of the stylus 69 and will be recognized as a modification of the stylus 20 in the device of Fig. 1. It will be seen that turning the rate control screw by means of the lever 62 will move the surfaces 68 and 70 either toward or away from each other, depending on direction of turning the lever.

The details of operation of the various components of the device of Fig. 1, such as the attachment device 24 shown in Fig. 3, and of the spool valves, machine tools, and hydraulic systems, can be found in the above-mentioned co-pending applications. The rate control adjustment device is the invention in the instant application, and therefore the description of operation will relate only to this device.

With relation to the embodiment of Fig. 1, the rate adjustment device is first adjusted by moving the stylus 20 to its rest position. Then the rate adjustment housing is screwed against the graduation ring and the vertical adjustment screw 46 is backed off. The rate adjustment screw 41 is next tightened down against the body 33, and then the set screw 50 is released and the handle 49 is turned to indicate some zero position with respect to the markings on the graduation ring 51. With the handle held in this position, the set screw 50 is tightened. The handle will now turn the rate adjustment screw. The vertical adjustment screw 46 will be tightened down so as to make contact with the upper end of stylus 20 and then the screw is backed up so as to provide the desired clearance between the stylus tip and the lower end of the vertical adjustment screw 46. With the screw 46 held in this position, the acorn nut 47 is tightened down to hold the adjustment.

It will be seen that in this position the stylus can move up and down to some maximum amount which is determined by the vertical adjustment screw, while there is no freedom for lateral motion, since the surface 34 of the body is making contact with the surface 45 of the threadably adjusted screw. The handle 49 is therefore turned so as to back off the threadedly adjusted screw and leave a spacing between the surfaces 34 and 45. Thereafter the stylus can be pivoted so as to move the body 35 sideward in channel 36 until the surfaces 34 and 45 again make contact. It will be appreciated that the farther the surfaces 34 and 45 are spaced from each other by backing off the rate adjustment screw, the farther the stylus may be tilted, and therefore the greater may be the opening of the spool valves, which opening determines the rate of speed to the cutting tool.

The spring 44 keeps the threads 42 firmly engaged in threaded passage 40 so as to eliminate backlash. There will therefore be little, if any, longitudinal looseness of fit between the rate control housing and the rate adjustment screw.

In the embodiment of Fig. 5, there is no provision for limitation of vertical movement of the stylus. However, when the tracer mechanism is to be used only for two dimensional reproduction, there will be no Z axis cylinder or spool valve, and therefore no vertical movement. As in the device of Fig. 1, the stylus is first centered, and the rate control housing is seated against the graduation ring 66. Then the rate adjustment screw 58 is screwed downward so as to contact the end of the stylus 69, with the surfaces 68 and 70 in contact with each other. Then the set screw 63 is loosened so that the handle 62 may be moved to a datum or zero position. The set screw is retightened, and cap 64 is attached by means of set screw 65.

The handle 62 is then turned so as to back off the threadedly adjusted screw from the stylus so there is a clearance between the surfaces 68 and 70, and so that the stylus can pivot. The amount of spacing between the surfaces 68 and 70 determines the distance by which the stylus can be tilted, and therefore the amount of opening of the spool valves, which in turn control the rate of feed to the cutting tool. Spring 61 maintains a firm anti-backlash contact between the threads 59 and the threaded passage 57.

The surfaces 34 and 45, and 68 and 70 have been illustrated as mating surfaces of revolutions in the form of frustum of cones. It will be evident that any non-planar surfaces are also useful, and they might not even be matching or mating, although for best results they will be matching and mating. One of said surfaces will project into the other; that is, one will be convex and the other concave. It has been found preferable to utilize conical frustums having a conical angle between 60 and 90 degrees. It will further be understood that surfaces need not be provided at the very tip end of the stylus, but may if desired be located somewhere along the length of the stylus.

The tracer mechanism may, if desired, be set to limit the maximum rate of feed, by initially tilting the stylus to its maximum displacement for a given rate, setting the handle against stop 52 or 66a, and then the only movement of the handle permitted by the stops will be that which diminishes the feed rate.

It will be understood that the term "valves" as used herein is not restricted to spool valves, or even to hydraulic valves, but includes any means by which tilting or shifting of the stylus causes a variable amount of power to be supplied to the motors on the machine tool.

This invention is not to be limited to the embodiment shown in the drawings and described in the description, which are given by way of example and not of limitation, but only in accordance with the scope of the appended claims.

I claim:

1. In a tracer mechanism having a housing and three mutually perpendicular spool valves in said housing, said valves being actuated by a stylus mounted to a first of said spool valves for vertical movement with said spool valve, said vertical movement being at substantially right angles to the lines of movement of the other two of said three valves, said stylus being mounted to said first spool valve for pivotal movement therein, vertical movement of the stylus actuating the first valve, and said pivotal movement of the stylus actuating the other two valves, means for restricting both the vertical and pivotal movement of said stylus, comprising: a rate adjustment screw threadedly mounted in the housing, a vertical adjustment screw threadedly mounted through the rate adjustment screw, both of said screws being substantially collinear with the stylus, a non-planar surface on the said rate adjustment screw and a non-planar surface on the said stylus, one of said surfaces being convex and the other being concave, the convex surface being so disposed and arranged that it is adapted to make contact with said concave surface when the stylus is pivotally moved, the rate adjustment screw and the vertical adjustment screw being longitudinally moveable by their respective threaded mounting for varying the spacing between said surfaces, whereby the pivotal movement of the stylus is adjustably limited by engagement of the said surfaces, and whereby the vertical movement of the stylus is adjustably limited by the contact of the stylus with said vertical adjustment screw.

2. Apparatus according to claim 1 in which there is further provided a retainer attached to said housing, a body held adjacent to the rate adjustment screw by said retainer bearing the non-planar surface associated with the stylus, said body being laterally slidable relative to said rate adjustment screw, and having a hole therethrough for receiving the stylus, a ball-like member on said stylus making a close fit in said hole, so that said ball-like member can rotate around any horizontal axis thereof, sidewise movement of the said ball-like member as a consequence of tilting movement of the stylus moving the body into contact with the rate adjustment screw.

3. Apparatus according to claim 1 in which the surfaces are surfaces of revolution.

4. Apparatus according to claim 1 in which the surfaces are frusto-conical.

References Cited in the file of this patent

UNITED STATES PATENTS

| | | |
|---|---|---|
| 1,910,909 | Werder | May 23, 1933 |
| 2,433,005 | Turchan | Dec. 23, 1947 |
| 2,753,145 | Rosebrook | July 3, 1956 |